Aug. 24, 1937.   H. LEDWINKA   2,090,893
FINAL DRIVE GEAR FOR VEHICLES
Filed July 7, 1936
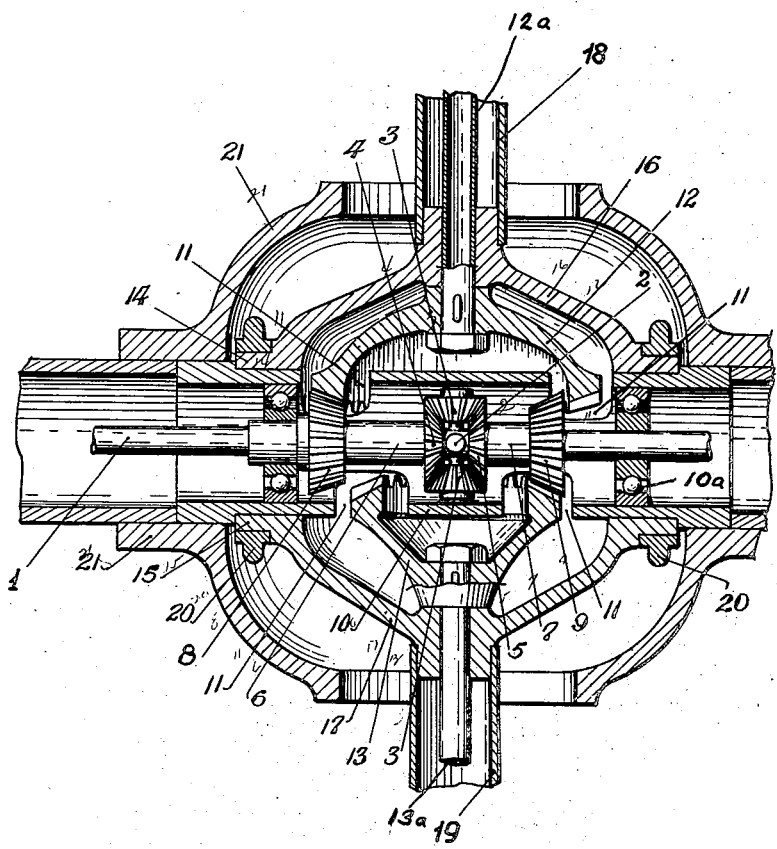
Inventor
Hans Ledwinka
By B. Singer, atty.

Patented Aug. 24, 1937

2,090,893

UNITED STATES PATENT OFFICE 2,090,893

FINAL DRIVE GEAR FOR VEHICLES

Hans Ledwinka, Koprivnice, Czechoslovakia

Application July 7, 1936, Serial No. 89,450
In Czechoslovakia July 15, 1935

7 Claims. (Cl. 74—311)

The present invention relates to the differential drive mechanism of motor vehicles and it has for an object to provide such a mechanism as can be easily assembled and the proper alignment of parts maintained.

Further, it is an object to provide a differential drive mechanism wherein the bevel pinions carried by the drive shaft may all be assembled in a single bearing carrier which assemblage is insertable as a unit in the differential housing.

Further, it is an object to provide means whereby the half-axles may be supported on the said single bearing element in a manner so that the axes of said half-axles will always be maintained in alignment with one another and normal to the axis of the drive shaft.

Further, it is an object to provide a single bearing carrier for the front and rear bearings of the drive shaft, the carrier being mounted at its ends in the main housing, the differential gears being located in such bearing carrier, the latter having openings into which the ring gears on the ends of the half-axles project so as to mesh with certain of the gears within the bearing carrier.

Further features and advantages of the invention will appear from the embodiment shown in the accompanying drawing which illustrates diagrammatically in horizontal section an axle gearing together with the inner ends of the axles, the axle housing and the connected vehicle chassis parts.

Referring to the drawing, a longitudinal driving shaft 1 carries a pivot cross 2 with bevel gears 3. The bevel wheels 3 mesh with bevel gears 4 and 5 which are connected with hollow shafts 6 and 7 respectively. There are, furthermore, fixed on the hollow shafts 6 and 7 respectively bevel gears 8 and 9. The differential gear unit formed by the said parts is carried in a tubular body or bearing carrier 10 preferably by means of the bearings 10a inserted between the inner wall of the body 10 and the shaft 1. The tube has cut-out parts 11 to permit the dished ring-gears 12 and 13 which are fixed on the inner ends of half axle shafts 12a or 13a, to engage with the bevel gears 8 or 9 respectively. On its outer surface, the tube 10 has bearing surfaces for semicylindrical bearing portions 14 and 15 of fork arms 16 and 17 of the half axle casings 18 or 19. The bearing portions 14 and 15, which are always opposite each other, are held together and on the bearing surfaces of the body 10 by rings 20.

The driving and bearing unit so formed is fitted in the outer housing 21 after the adjustment of the different parts, and is supported therein by means of the portion of the body 10 projecting at each end beyond the bearing pieces 14 or 15. The outer housing consists of two parts and the sleeve 10 is firmly held in place in the outer housing.

In addition to the advantages already mentioned, this embodiment has also the further advantage that the axle housing is, as compared with previous constructions, lighter and can be made of less expensive material; with the improved construction, the inserted tubular body 10 itself takes most of the stress.

The shaft 1 is the driving or power shaft and carries the bevel gears 3, which drive gears 4 and 5; gears 4 and 5 through their associated gears 8 and 9 respectively drive the ring gears 12 and 13 respectively, which turn the half-axles 12a and 13a, respectively, on which axles the driving wheels (not shown) of the vehicle are secured in the usual way. The outer casing 21 is of course held relatively stationary in any way suitable.

Various changes or modifications of the details of construction of the various parts of the mechanism may of course be made without departing from the scope of the invention as recited in the appended claims.

What I claim is:—

1. In a differential mechanism, an outer hollow housing having two pairs of aligned oppositely disposed openings, a driving shaft passed through one of said openings into said housing, a bearing carrier surrounding said shaft and located within said housing, and held with its respective ends in said openings, a front and a back bearing for said shaft held in said carrier, differential drive pinions on said shaft, sleeves each having a bevel pinion meshing with said differential drive pinions and having a bevel gear, said bearing carrier having openings adjacent said bevel gears, half-axles carrying ring gears meshed with said bevel gears respectively through said openings, and means to support said half-axles on said bearing carrier.

2. In a differential mechanism, an outer hollow housing having two pairs of aligned oppositely disposed openings, a driving shaft passed through one of said openings into said housing, a bearing carrier surrounding said shaft and located within said housing, and held with its respective ends in said openings, a front and a back bearing for said shaft held in said carrier, differential drive pinions on said shaft, sleeves each having a bevel pinion meshing with said differential drive pinions and having a bevel gear, said bearing carrier having openings adjacent said bevel gears, half-axles carrying ring gears meshed with said bevel gears respectively through said openings, half-axle housings having bearings for said half-axles within said outer housing, and means to support said half-axle housings in said outer hollow housing on said bearing carrier.

3. In a differential mechanism, an outer hollow housing, a tubular bearing carrier supported within said housing with its ends in opposite walls thereof, a pair of half-axle housings supported on the outside of said bearing carrier with said outer housing, half-axles carried by said half-axle housings, a drive shaft supported by front and back bearings in said bearing carrier, and differential gear connections between said drive shaft and said half-axles.

4. In a differential mechanism, an outer hollow housing, a tubular bearing carrier supported within said housing with its ends in opposite walls thereof, a pair of half-axle housings supported on the outside of said bearing carrier with said outer housing, half-axles carried by said half-axle housings, a drive shaft supported by front and back bearings in said bearing carrier, differential gear connections between said drive shaft and said half-axles, and located between said front and back bearings.

5. In a differential mechanism, an outer hollow housing, a tubular bearing carrier supported within said housing with its ends in opposite walls thereof, a pair of half-axle housings supported on the outside of said bearing carrier with said outer housing, half-axles carried by said half-axle housings, a drive shaft supported by front and back bearings in said bearing carrier, differential pinions and gears on said drive shaft between said front and back bearings, and cooperating ring gears on said half-axles, said bearing carrier having openings for said ring gears to pass.

6. In a differential mechanism, an outer hollow housing, a tubular bearing carrier supported within said housing with its ends in opposite walls thereof, a pair of half-axle housings supported on the outside of said bearing carrier with said outer housing, half-axles carried by said half-axle housings, a drive shaft supported by front and back bearings in said bearing carrier, differential pinions and gears on said drive shaft between said front and back bearings, and cooperating ring gears on said half-axles, said bearing carrier having openings for said ring gears to pass, said bearing carrier comprising a tube with shoulders on which and between said shoulders the half-axle housings are supported.

7. In a differential mechanism, a chambered outer housing constituting a main carrier, a single bearing-carrier supported by and within said main carrier, a driving shaft and a pair of driven half-axles carried by said bearing carrier, and differential gear elements connecting said driving shaft with said half-axles and comprising pinions and ring gears, said pinions all being carried within said bearing carrier and said ring gears being carried on the outside of said bearing carrier, the latter having openings through which the ring gears engage their respective associated pinions.

HANS LEDWINKA.